US006761488B2

(12) United States Patent
Weigel

(10) Patent No.: US 6,761,488 B2
(45) Date of Patent: Jul. 13, 2004

(54) HOLDING DEVICE FOR HOLDING AT LEAST ONE OPTICAL PLUG

(75) Inventor: Hans-Dieter Weigel, Caputh (DE)

(73) Assignee: Infineon Technologies AG, Munich (DE)

( * ) Notice: Subject to any disclaimer, the term of this patent is extended or adjusted under 35 U.S.C. 154(b) by 254 days.

(21) Appl. No.: 09/809,859

(22) Filed: Mar. 16, 2001

(65) Prior Publication Data

US 2002/0159710 A1 Oct. 31, 2002

(51) Int. Cl.[7] ........................... H01R 13/64; G02B 6/38
(52) U.S. Cl. .......................................... 385/58; 439/376
(58) Field of Search .............................. 385/55, 58, 65, 385/66, 75, 83; 439/376

(56) References Cited

U.S. PATENT DOCUMENTS 4,953,929 A 9/1990 Basista et al.
5,123,071 A * 6/1992 Mulholland et al. .......... 385/53
5,777,848 A * 7/1998 McAnally et al. .......... 361/725
6,354,861 B2 * 3/2002 Schmitt et al. ............. 439/376
2003/0012520 A1 * 1/2003 Rogge et al. ................. 385/88
2003/0072536 A1 * 4/2003 Shibutani et al. ............. 385/70

FOREIGN PATENT DOCUMENTS

DE 43 02 826 C1 3/1994
EP 0 647 865 A1 4/1995

* cited by examiner

*Primary Examiner*—Chandrika Prasad
(74) *Attorney, Agent, or Firm*—Laurence A. Greenberg; Werner H. Stemer; Gregory L. Mayback

(57) ABSTRACT

The invention relates to a holding device for holding at least one optical plug that can be coupled with a coupling partner in an optical coupling system. According to the invention, the holding device comprises an inner holding part (11) into which the plug (3) can be locked and an outer holding part (12) in which the inner holding part (11) is arranged so as to be rotatable and laterally displaceable. The holding device enables a coupling of an optical plug with a coupling partner even for the case in which the coupling partner is situated with an imprecise position.

11 Claims, 6 Drawing Sheets

11
3
3
113
37a
11
31
32
126
124
12
125
121
123
124
122

HOLDING DEVICE FOR HOLDING AT LEAST ONE OPTICAL PLUG

BACKGROUND OF THE INVENTION

FIELD OF THE INVENTION

The invention relates to a holding device for holding at least one optical plug that can be coupled with a coupling partner in an optical coupling system.

It is known to couple an optical plug, having a plurality of light waveguides arranged parallel to one another, with a coupling partner, with the aid of a holding device. Coupling partners are for example optical transmission and/or reception modules that are arranged on a circuit board, or, rather, optical ports/plug receivers formed on said modules.

With the use of high transmission frequencies in the Gbit/s range, it is thereby standard to arrange an optical transmission module and an optical reception module next to one another on a circuit board. These modules situated closely alongside one another have completely separate manners of functioning, and are also situated in different housings, in order to ensure a mutual shielding and to avoid cross-talk. Correspondingly, the optical connections to each module are created through separate plugs.

For functional reasons and for reasons of safety, it is desirable to couple or, respectively, decouple the two optical plugs for the two modules with, or from, the respective coupling partner at the same time. For this purpose, from EP-A1-0 807 837 it is known to arrange the two optical plugs in one holding device. However, the problem thereby arises that the modules (transmission and reception module) situated in a fixed manner on the circuit board do indeed have a definite, relatively precisely defined spacing from one another, but this spacing however naturally possesses a tolerance that is high in comparison with the precision that is required (a few m) for the coupling of the light waveguides of an optical plug with the light waveguides of the coupling partner. In this way, there arises the risk that the coupling partners cannot be coupled with one another with the required precision, or that tensions will occur in the system, caused by different spacings of the plugs in the holding device and of the modules on the circuit board.

SUMMARY OF THE INVENTION

Accordingly, the invention is based on the object of providing a holding device, for holding at least one optical plug, that reliably enables a coupling of an optical plug with a coupling partner even for the case in which the coupling partner is subject to tolerances in its position.

According thereto, it is inventively provided that the holding device comprises an inner holding part into which the plug can be locked and an outer holding part in which the inner holding part is situated so as to be rotatable and laterally displaceable. A coupling of the plug or plugs with a coupling partner thereby takes place in that an operator grasps the outer holding part, with the plug or plugs situated therein, and moves it in the direction of the coupling partner until the coupling partners lock with one another in a known manner.

Due to the circumstance that the inner holding part is arranged in the outer holding part so as to be rotatable and laterally displaceable, the inventive holding device thereby provides a tolerance compensation in relation to a coupling partner that is arranged with a positional tolerance. In this way, a lateral offset of the coupling partner can be compensated by the lateral displaceability of the inner holding part in the outer holding part, and an angular offset of the coupling partner can be compensated by the rotatability of the inner holding part in the outer holding part.

Due to the inherent high precision of the coupling system, as a rule it is sufficient to provide a relatively small rotatability, of a maximum of a few degrees, and a relatively small lateral displaceability, of a maximum of one millimeter.

In a preferred construction of the invention, the outer holding part comprises at least one elongated hole in which a bearing pin of the inner holding part engages. The elongated hole thereby provides both a rotatability of the inner holding part and also a lateral displaceability of the inner holding part in relation to the outer holding part. The elongated hole thereby preferably extends transverse to the plug-in direction of a plug.

In the preferred construction of the invention, the holding device holds at least two plugs, each of which is fixed in an inner holding part, whereby the outer holding part is fashioned in one piece and with receive openings for receiving a respective inner holding part, and whereby each inner holding part is arranged in the respective receive opening of the outer holding part so as to be rotatable and laterally displaceable. This construction provides in particular a duplex holding device that receives two plugs, for example for coupling an optical transmission module and an optical reception module arranged at a defined distance therefrom. Due to the rotatability and lateral displaceability of the inner holding part in the outer holding part, the two plugs can pivot and/or move laterally in the holding device in order to compensate a positional tolerance of the two coupling partners.

The outer holding part is thereby preferably fashioned in such a way that the individual receive openings are separated from one another by a partition wall. In addition, the outer holding part is preferably provided on its outside with a ribbing, in order to enable it to be grasped better and more securely.

The inner holding part preferably comprises a locking element that works together with complementary structures of the plug in order to lock an optical plug in or out. The optical plug is thereby arranged in the inner holding part essentially without play. A compensation of positional tolerances of the coupling partner takes place via the inventive arrangement of the inner holding part in the outer holding part.

The locking element of the inner holding part comprises for example a locking clip that, when an optical plug is introduced into the inner holding part, comes to rest on a stop of the plug.

It is thereby preferably provided that the outer holding part comprise at least one opening via which, using a tool, the locking element of the inner holding part can be actuated from the outside, thereby enabling the unlocking of a plug that is fixed in the inner holding part. In this way, a simple unlocking and removal of an optical plug from the inner holding part is enabled.

In the following, the invention is explained in more detail on the basis of an exemplary embodiment, with reference to the figures of the drawings.

DESCRIPTION OF THE PREFERRED EMBODIMENT

Figure 1:
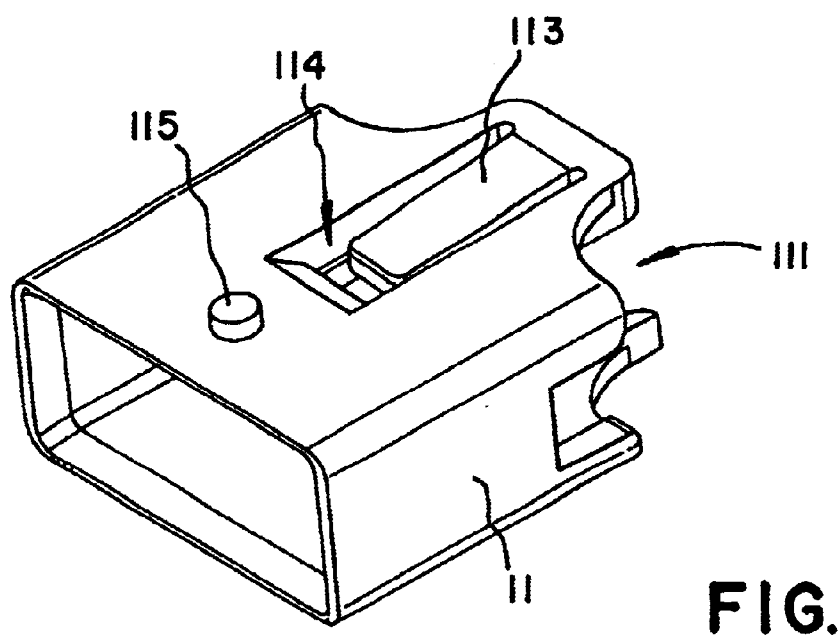
FIG. 1 shows a perspective view of an inner holding part of an inventive holding device.
Figure 2:
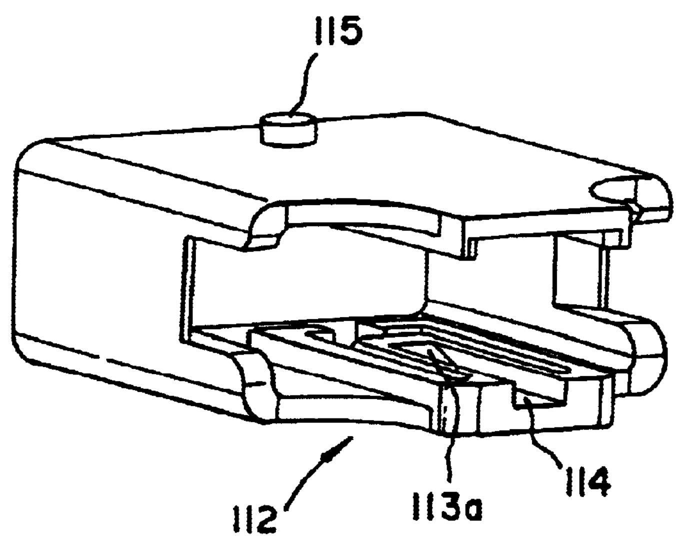
FIG. 2 shows a different perspective view of the holding part of FIG. 1.
Figure 3:
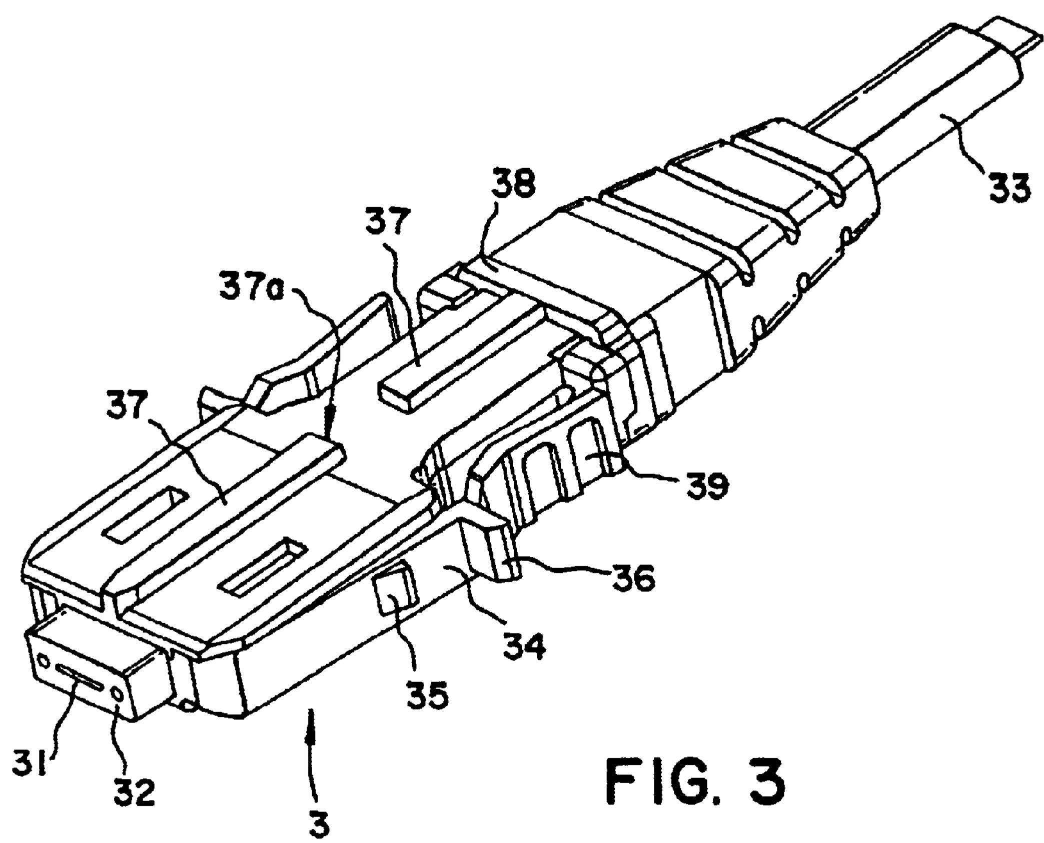
FIG. 3 shows a perspective view of a known optical plug.

In FIGS. 1 and 2, an inner holding part 11 of an inventive holding device is shown that is used to receive a known optical plug 3 according to FIG. 3.

According to FIG. 3, the plug 3 comprises a multiplicity of light waveguides 31 for parallel optical data transmission that terminate in planar fashion at a front side 32 of the plug 3. The light waveguides 31 enter from the rearward end of the plug 3 as a common tape cable 33. For coupling with a coupling partner (cf. FIG. 7), locking arms 34 are provided that are each provided with a locking projection 35 and a ridge 36 that runs transversely, whereby both the locking projection and also the ridge comprise a leading incline. The rearward end of the locking arms passes over into an actuation region 39 that can be actuated by an operator in order to unlock the plug 3 from a coupling partner.

In addition, on its housing surface the plug forms a sliding ridge 37 with which the plug can slide along on corresponding surfaces of the inner holding part 11. The sliding ridge 37 is fashioned with interruptions, thus providing a stop 37*a* for a locking connection with the inner holding part 11. At the end of the sliding ridge 37 close to the cable, a transverse ridge 38 is situated that, when the plug 3 is introduced, limits the plug-in depth of the plug 3 by stopping against an end face of the inner holding part 11.

The inner holding part 11 of FIGS. 1 and 2 is essentially cuboidal in construction and comprises an insert opening 111 for receiving an optical plug 3. In the area of the insert opening 111 it comprises a semicircular lateral openings [sic] 112 that ensure that when the plug 3 is introduced into the inner holding part, an operator will have sufficient access to the actuation area 39 of the locking arms 34.

In addition, the holding part 11 has a locking clip 113 coupled in spring-loaded fashion to the holding part, said clip forming at its end a locking projection 113*a* and being situated in an opening 114 of holding part 11. Said clip comes to a stop, with the locking projection 113*a*, behind the stop 37*a* of the sliding ridge 37 (cf. FIG. 3) when the plug 3 is introduced into the inner holding part 11, and in this way fixes the plug 3 in the inner holding part.

The dimensions of the inner holding part 11 and the plug 3 are such that the plug 3 is fixed in the inner holding part 11 essentially without play.

For connection with an outer holding part 12 (cf. FIG. 5) of the holding device, a protruding bearing pin 115 is fashioned on the upper side of the inner holding part 11. A correspondingly positioned bearing pin is also fashioned on the underside of the holding part 11.

Figure 4:
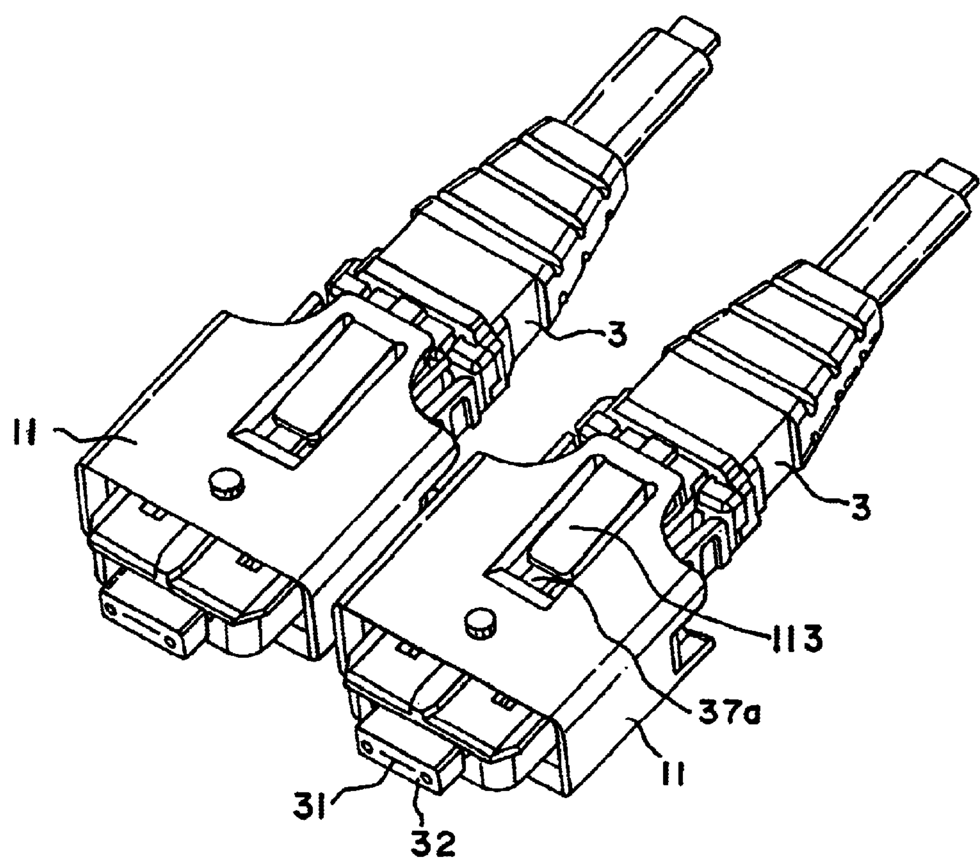
FIG. 4 shows a perspective view of two optical plugs according to FIG. 3, each arranged in an inner holding part according to FIGS. 1, 2.

FIG. 4 shows, in a duplex arrangement, two optical plugs 3 that are each arranged in an inner holding part according to FIGS. 1 and 2. The locking clip 113 of the inner holding part is thereby respectively locked in behind the stops 37*a* of the plugs. The front side 32 of the plugs, with the light waveguide ends 31 that are to be coupled, protrudes somewhat from the inner holding part 31, in order to enable simple insertion into the plug receptacle of a coupling partner.

Figure 5:
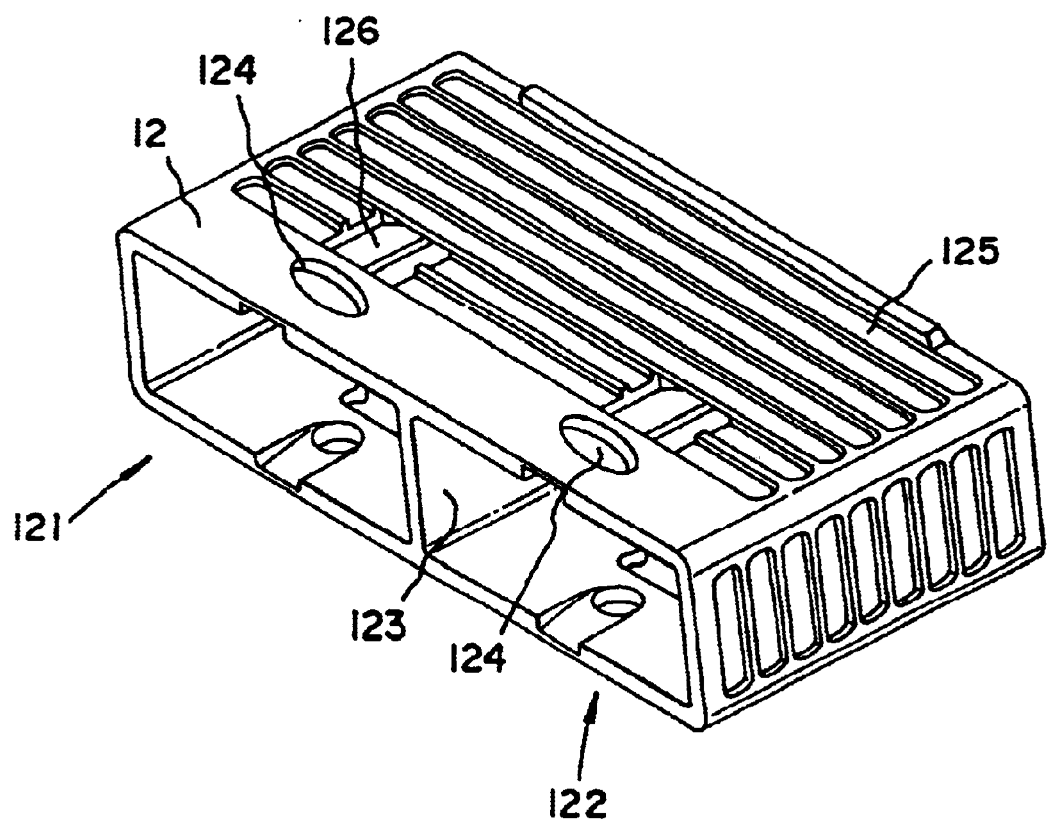
FIG. 5 shows a perspective view of an outer holding part of an inventive holding device.

An outer holding part 12 of the inventive holding device is shown in FIG. 5. The outer holding part 12 comprises two receive areas 121, 122, each of which receives an inner holding part 11 in corresponding receive openings. The two receive areas 121, 122 are separated from one other by a partition wall 123. An elongated hole 124 is fashioned in each receive area 121, 122, on the upper and lower housing wall.

The elongated hole 124 is used for the respective reception of a bearing pin 115 of the inner holding part. After locking of the bearing pin 115 of an inner holding part into the elongated holes 124, the inner and outer holding part are connected with one another. The connection is thereby inventively such that the inner holding part 11 is on the one hand rotatable in the outer holding part 12 and is on the other hand displaceable transverse to the plugging direction. In this way, these two degrees of freedom are provided by the coupling of the bearing pin with the elongated hole.

It is hereby pointed out that the elongated hole character of the elongated holes 124 in FIG. 5 is not very pronounced, since only a small lateral displaceability of the inner holding part is required.

The outer holding part 12 is provided with a ribbing 125 in order to enable better grasping of the outer holding part 12. In addition, in each receive area an opening or, respectively, a through-hole 126 is provided in the holding part 12. This opening is used to enable the locking clip 113 of the inner holding part to be lifted using a tool, for example a screwdriver, and thereby to effect an unlocking of the plug 3 from the inner holding part 11, while the inner holding part 11 is situated in the outer holding part 12.

Figure 6:
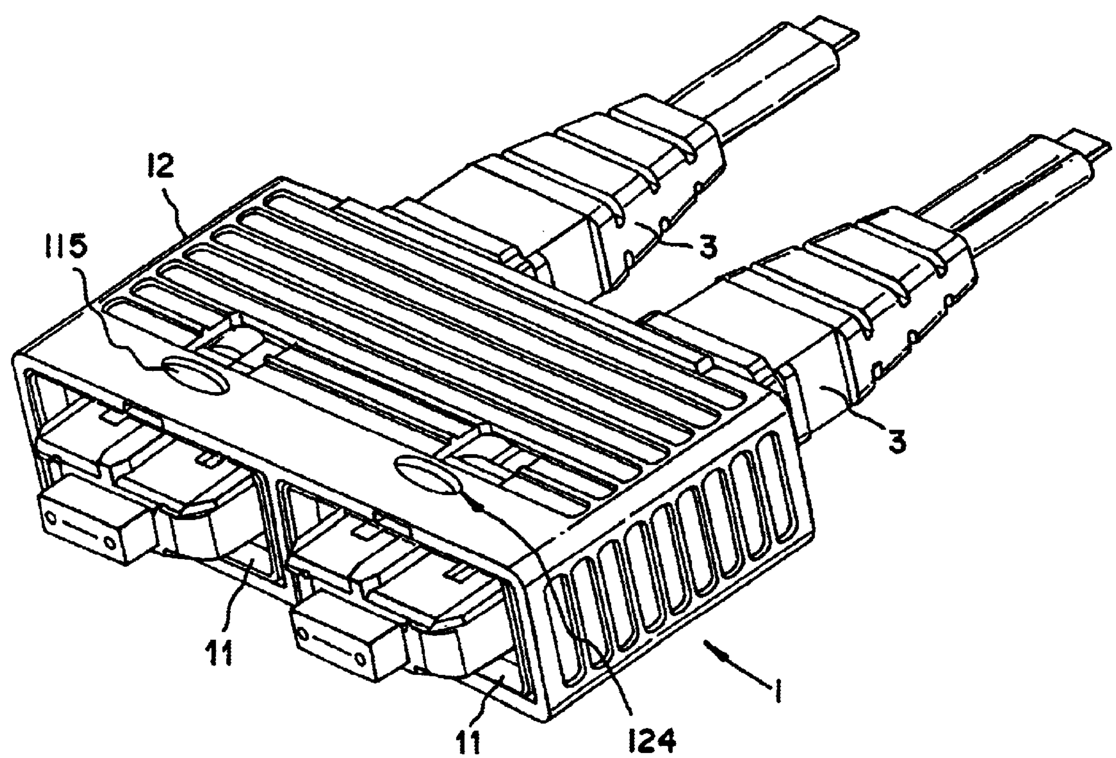
FIG. 6 shows the arrangement of the inner holding parts with optical plug according to FIG. 4 in the outer holding part of FIG. 5.

In FIG. 6, the inventive holding device 1 is shown with two inner holding parts 11 introduced into the outer holding part 12, and with two optical plugs 3 respectively fixed in the inner holding part 11. The bearing pins 115 are thereby respectively locked into the elongated holes 124. For the coupling of the two plugs 3 with a respective coupling partner, the overall system is grasped by an operator at the outer holding part 12 and is moved towards the coupling partners, whereby the plugs lock into corresponding plug receptacles of the coupling partners.

Figure 7:
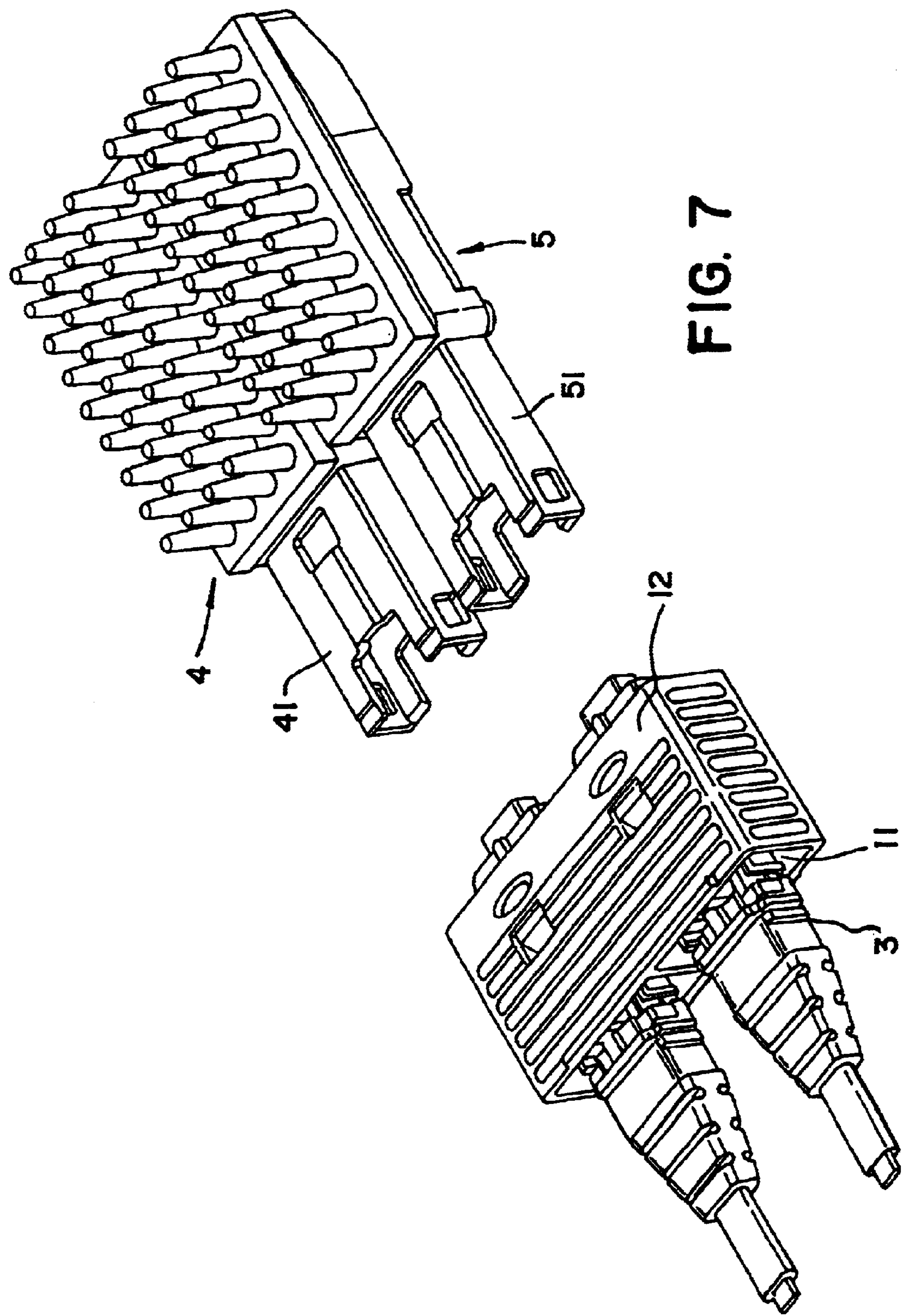
FIG. 7 shows the arrangement of FIG. 6 with a transmission module and a reception module as coupling partners of the optical plug.

In FIG. 7, as coupling partners plug receptacles 41, 51 of a known optical transmission module 4 and of an optical reception module 5 are shown. The two modules 4, 5 are fastened next to one another with a defined spacing on a circuit board (not shown). Their spacing and their orientation to another thereby necessarily have a certain positional tolerance.

Nonetheless, on the basis of the inventive holding device it is possible to introduce the plugs 3 into the plug receptacles 41, 51 with the required precision of a few μm, since, through the rotatability and lateral displaceability of the inner holding part 11 in the outer holding part 12, it is possible to compensate an offset between the two plugs 3 that are to be coupled jointly and the two modules 4, 5.

The actual coupling between the plugs 3 and the plug receptacles 41, 42 takes place in a known manner through corresponding guide surfaces and mutually engaging guide grooves and ridges, as well as the locking arms 34 of the plugs 3.

I claim:

1. A holding device for holding at least one optical plug to be coupled with a coupling partner in an optical coupling system, the holding device comprising:

an inner holding part for receiving and locking an optical plug thereto;

an outer holding part for receiving said inner holding part such that said inner holding part is rotatable and laterally displaceable in the plug-in direction along its full length.

2. The holding device according to claim 1, wherein:

said inner holding part is formed with a bearing pin; and said outer holding part is formed with an elongated hole into which said bearing pin of said inner holding part engages.

3. The holding device according to claim 2, wherein said elongated hole extends transversely to a plug-in direction of the optical plug.

4. The holding device according to claim 1, comprising:

a first inner holding part for receiving and locking a first optical plug thereto, said first inner holding part defined by said inner holding part and said first optical plug defined by said optical plug; and a second inner holding part for receiving and locking a second optical plug thereto;

said outer holding part formed with a first receive opening for receiving said first inner holding part such that said first inner holding part is rotatable and laterally displaceable;

said outer holding part formed with a second receive opening for receiving said second inner holding part such that said second inner holding part is rotatable and laterally displaceable; and said outer holding part formed in one piece.

5. The holding device according to claim 4, wherein said outer holding part is formed with a partition wall separating said first receive opening and said second receive opening.

6. The holding device according to claim 1, wherein said outer holding part has an outer side formed with ribbing.

7. The holding device according to claim 1, wherein said outer holding part has an essentially cuboidal shape.

8. The holding device according to claim 1, wherein:

said inner holding part includes a locking element for locking and unlocking the optical plug; and said locking element is formed to cooperate with complementary structures of the optical plug.

9. The holding device according to claim 8, wherein said outer holding part is formed with at least one opening enabling said locking element of said inner holding part to be actuated using a tool to unlock the optical plug.

10. The holding device according to claim 8, wherein said locking element includes a locking clip formed such that that when the optical plug is introduced into said inner holding part, said locking clip comes to rest on a stop of the plug.

11. The holding device according to claim 10, wherein said outer holding part is formed with at least one opening enabling said locking element of said inner holding part to be actuated using a tool to unlock the optical plug.

* * * * *